L. A. HOWE.
NUT LOCK.
APPLICATION FILED MAR. 19, 1915.
1,192,636.
Patented July 25, 1916.
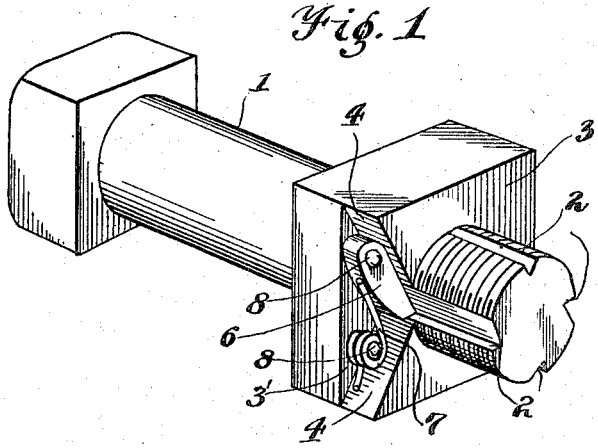
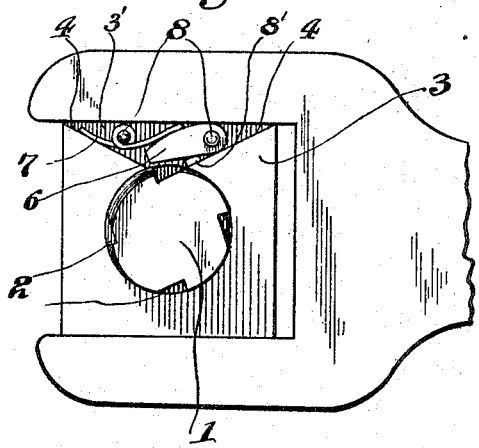
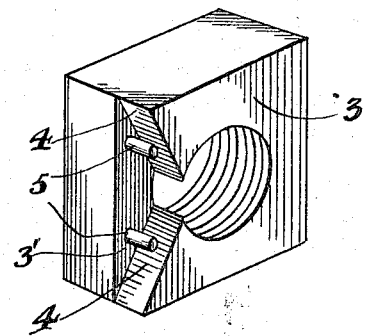
Inventor
L. A. Howe.
Witnesses
By Victor J. Evans
Attorney

UNITED STATES PATENT OFFICE.

LUEMAN A. HOWE, OF WEST TERRE HAUTE, INDIANA.

NUT-LOCK.

1,192,636.     Specification of Letters Patent.     Patented July 25, 1916.

Application filed March 19, 1915.   Serial No. 15,501.

*To all whom it may concern:*

Be it known that I, LUEMAN A. HOWE, a citizen of the United States, residing at West Terre Haute, in the county of Vigo and State of Indiana, have invented new and useful Improvements in Lock-Nuts, of which the following is a specification.

This invention relates to certain new and useful improvements in lock nuts, and the object of the invention is to simplify and improve the existing art by providing a simple, cheap and thoroughly effective device of this character which will sustain a nut upon a bolt against accidental removal.

With the above and other objects in view, the improvement resides in the construction, combination and arrangement of parts set forth in the following specification and falling within the scope of the appended claim.

In the drawing: Figure 1 is a perspective view illustrating a nut locked upon a bolt in accordance with the present invention, Fig. 2 is a front elevation showing the manner of applying a wrench and raising the locking member of the nut out of the groove of the bolt to permit of the separation of the nut from the bolt, and Fig. 3 is a perspective view of the nut with the locking dog and spring removed.

Referring now to the drawing in detail, the numeral 1 designates an ordinary bolt having its threaded shank provided with longitudinally extending grooves 2.

The numeral 3 designates a nut which is screwed upon the bolt. This nut is of the ordinary construction, except that the same has one of its faces provided with a substantially V-shaped depression which communicates with one of its sides, the said depression also entering the bore of the nut. The inner wall provided by the depression, indicated by the numeral 3′ may have integrally formed therewith, at suitable points adjacent its beveled side walls 4, studs or pins indicated by the numerals 5, and also these pins or studs may be removably secured to the said rear wall 3′ if desired. One of these pins is adapted to serve as a pivot for a dog 6, the said dog normally resting upon one of the inclined side walls 4 and having its working face passing through the opening provided in the lower wall of the depression, into the bore of the nut and received in one of the grooves of the bolt, to hold the nut and bolt in locked position. The second pin has arranged thereon a spring 7, the said spring bearing upon the outer face of the dog to hold the same in its locked position. It will be noted, by reference to the drawing, that both the dog and spring are wholly concealed within the substantially V-shaped depression, and the pins, if integrally formed with the nut, may have their outer ends hammered to provide the same with heads 8 so that neither the spring or dog may be accidentally removed therefrom. It will be further noted that the dog may be arranged upon either of the sides 4, so that the dog and spring may be properly positioned upon a nut having either right or left hand threads. By reference to Fig. 2 it will be noted that one of the jaws of a wrench, when applied to the nut, may span the side of the nut provided with the depression, the said jaw of the wrench engaging the said side of the nut opposite the terminals of said depressions, while the second jaw of the wrench engages with the diametrically opposite side of the nut, so that the locking means of the nut will not interfere with the arrangement of the wrench upon any of the sides of the nut, and when the nut is to be removed, a wedge member 8′ is arranged between one of the inclined walls of the inner face of the dog to raise the same out of engagement with the groove of the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In combination a bolt having a threaded end, a nut threaded upon the threaded end of said bolt and having a V-shaped depression so as to provide a pair of oppositely but inwardly inclined side walls having their inner parts spaced to provide a kerf-communicating opening of the nut, said bolt being provided with a circumferentially spaced apart series of longitudinal grooves, each of said grooves having a relatively short and long edge, the pitch of the longer edges of said grooves being such as to dispose any of these edges flush with one of the inclined sides of the nut, a pair of studs secured directly opposite the inclined walls of said nut in said depression, a dog pivoted upon one of said studs and having a straight edge adapted to simultaneously engage one of said inclined walls of the nut and the longer edge of one of said grooves, and a flat spring supported upon the other stud having one end bearing against the other of said inclined walls and a single portion engaging said dog to hold its straight edge in contact against the mentioned edge of the groove.

In testimony whereof I affix my signature in presence of two witnesses.

LUEMAN A. HOWE.

Witnesses:
GEO. E. BROADHURST,
LAFE LONG.

Copies of this patent may be obtained for five cents each, by addressing the "Commissioner of Patents, Washington, D. C."